United States Patent
Lund et al.

(10) Patent No.: US 9,379,962 B2
(45) Date of Patent: Jun. 28, 2016

(54) NODE WITH AN IMPROVED BACK UP PROTOCOL

(75) Inventors: Hans-Ake Lund, Bohus (SE); Hans-Olof Sundell, Kalvsund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 158 days.

(21) Appl. No.: 13/636,396

(22) PCT Filed: Mar. 24, 2010

(86) PCT No.: PCT/EP2010/053295
§ 371 (c)(1),
(2), (4) Date: Sep. 21, 2012

(87) PCT Pub. No.: WO2011/116811
PCT Pub. Date: Sep. 29, 2011

(65) Prior Publication Data
US 2013/0010609 A1      Jan. 10, 2013

(51) Int. Cl.
*H04L 12/703* (2013.01)
*H04L 12/701* (2013.01)
*H04L 12/713* (2013.01)
*H04L 29/14* (2006.01)

(52) U.S. Cl.
CPC .............. *H04L 45/00* (2013.01); *H04L 45/586* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 2004/0198372 A1* | 10/2004 | Auterinen | 455/453 |
| 2007/0230472 A1* | 10/2007 | Jesuraj | 370/392 |
| 2009/0125995 A1* | 5/2009 | Vercellone et al. | 726/6 |
| 2010/0220656 A1* | 9/2010 | Ramankutty et al. | 370/328 |

FOREIGN PATENT DOCUMENTS

| | | |
|---|---|---|
| WO | 2008082331 A1 | 7/2008 |
| WO | 2008083374 A2 | 7/2008 |

OTHER PUBLICATIONS

3GPP TS 29.274 V8.4.0 (Dec. 2009) Evolved General Packet Radio Service (GPRS) Tunnelling Protocol for Control plane (GTPv2-C); Stage 3 (Release 8), EGPP, Dec. 2009.*
Nadas, S., et al., "Virtual Router Redundancy Protocol (VRRP) Version 3 for IPv4 and IPv6; rfc5798.txt", Internet Engineering Task Force, IETF; Standard, Internet Society (ISOC) 4, Rue Des Falaises Ch-1205 Geneva, Switzerland, Mar. 10, 2010, pp. 1-40, XP015068221.

* cited by examiner

*Primary Examiner* — Robert Wilson
*Assistant Examiner* — Ronald h Davis
(74) *Attorney, Agent, or Firm* — Rothwell, Figg, Ernst & Manbeck, P.C.

(57) ABSTRACT

A node (115, 210) for a mobile network (100), arranged to forward control plane signaling to and from an end user (140, 216) in the system (100) to other nodes in the system (100) and also being arranged to keep track of a state of the end user (140, 216). The node (115, 210) is arranged to use a so called VRRP protocol, Virtual Router Redundancy Protocol to monitor the function of a second node (120, 212) in the system, a so called "peer node" to the node (115, 210) itself and to have its own function be monitored by a VRRP of the peer node (120, 212). The node (115, 210) is also arranged to use a second protocol for transferring information on a state of the end user (140, 216) to the peer node. A node (120, 212) for receiving such information is also disclosed.

13 Claims, 5 Drawing Sheets

NODE WITH AN IMPROVED BACK UP PROTOCOL

CROSS-REFERENCE TO RELATED APPLICATION

This application is a 35 U.S.C. §371 National Phase Entry Application from PCT/EP2010/053295, filed Mar. 24, 2010, and designating the United States.

TECHNICAL FIELD

The present invention discloses a node for a mobile network, which has an improved back up function.

BACKGROUND

In a mobile network such as, for example, an Evolved Packet System, an EPS, there are stringent requirements and demands for reliability and non-interrupted functions.

SUMMARY

A purpose of the present invention is to improve the reliability and to decrease the likelihood of interruptions in the operation of a mobile network, such as, for example, an EPS, an Evolved Packet System.

This purpose is met by the present invention in that it discloses a node for a mobile network. The node of the invention is arranged to forward control plane signaling to and from an end user in the system to other nodes in the system and is also arranged to keep track of a state of the end user.

The node of the invention is arranged to use a so called VRRP protocol, Virtual Router Redundancy Protocol, in order to monitor the function of a second node in the system, a so called "peer node" to the node itself and to have its own function be monitored by a VRRP of the peer node.

According to the invention, the node is also arranged to use a second protocol for transferring information on a state of the end user to the peer node.

In one embodiment, the node of the invention is also arranged to inform the peer node that information transferred on the state of the end user is transferred to the peer node as back-up information for use in the case that the peer node's VRRP indicates that the transferring node exhibits a malfunction.

In one embodiment of the node of the invention, the second protocol uses the GTP protocol, the GPRS Tunneling Protocol.

The invention also discloses a node for a mobile network which is arranged to forward control plane signaling to and from an end user in the system to other nodes in the system. The node is arranged to use a so called VRRP protocol, Virtual Router Redundancy Protocol, to monitor the function of a second node in the system, a so called "peer node" to the node itself, and to have its own function be checked by the VRRP of the peer node.

According to the invention, this node is also equipped with a second protocol for receiving information on a state of the end user from the peer node.

In one embodiment, this node is further arranged to receive information from the peer node that information transferred on a state of the end user is transferred to the node as back up information for use in the case that the node's VRRP indicates that the peer node malfunctions.

In one embodiment of this node, the second protocol uses the GTP protocol, the GPRS Tunneling Protocol.

In some embodiments of both of the nodes of the invention, the states of the end user on which information is transferred to or received comprises one or more of the following:
The QoS, Quality of Service of the end user,
The IP address of one or more node in the system which is adjacent to the end user,
The EPS Bearer Contexts of the user,
Tunnel IDs for tunnels used to carry signaling and user payload for the UE,
Information related to handling of charging for the UE,
Maximum Bit Rates for the UE and its bearers,
Serving Network and User Location Information for the UE,
IMSI and MSISDN of the UE, International Mobile Subscriber Identity and Mobile Subscriber ISDN Number

BRIEF DESCRIPTION OF THE DRAWINGS

The invention will be described in more detail in the following, with reference to the appended drawings, in which.

DETAILED DESCRIPTION

Figure 1:
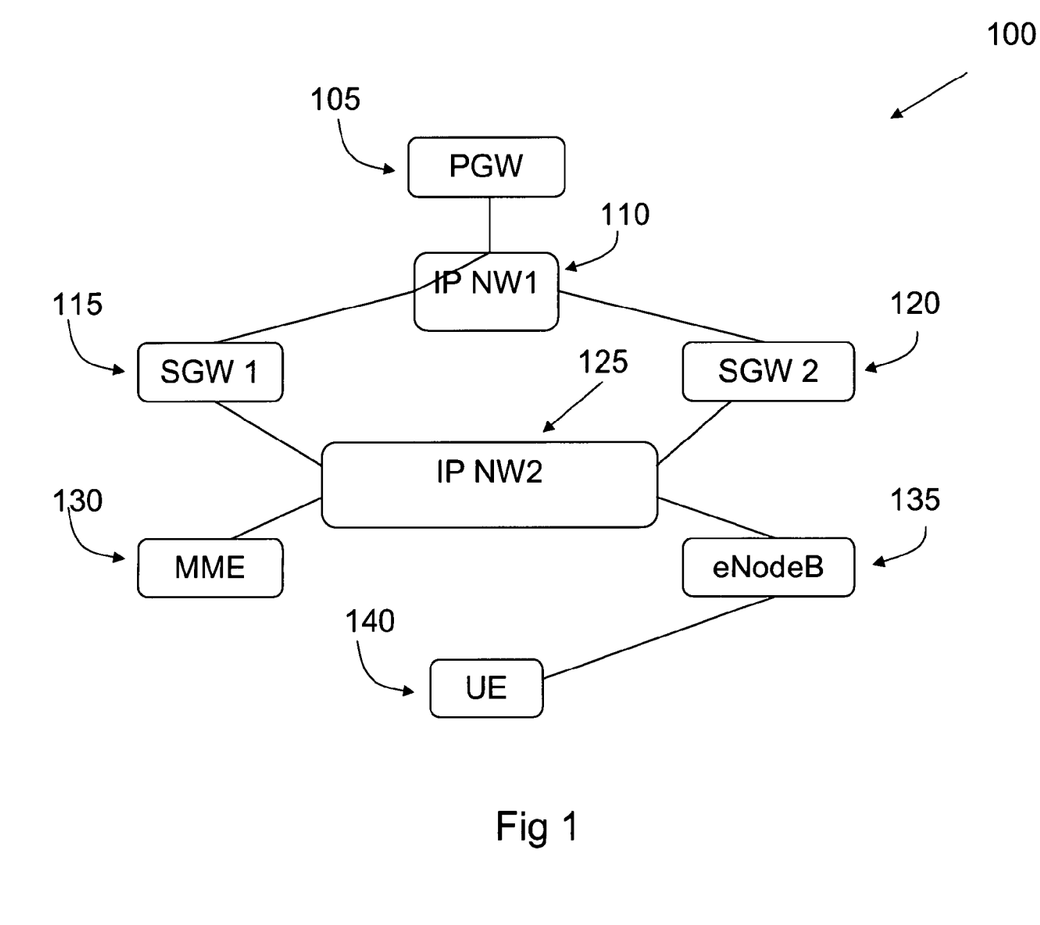
FIG. 1 shows an overview of a system in which the invention is applied.

FIG. 1 shows a schematic overview of a mobile network 100 for which the invention is intended. The mobile network 100, in this case a so called Evolved Packet System, an EPS, comprises a number of nodes, as shown in FIG. 1. Many operators have high requirements for reliability on their networks, which sometimes leads to a configuration in which all or most of the nodes in the network have a back-up node, with the two nodes being connected in a so called peer-to-peer relationship, where one of the nodes in the relationship is active and the other node in the relationship is in stand-by and is ready to take over the function of the active node at any time. For each node, the other node will be seen as its peer node.

One example of a frequently used known technology which enables a peer to peer relationship between two nodes in a network is the IETF (Internet Engineering Task Force) protocol RFC3768, also known as the Virtual Router Redundancy Protocol or VRRP. The VRRP monitors the nodes in a peer-to-peer relationship on the "IP-level", i.e. the protocol checks if the peer node is alive or not. If the peer node of a stand-by node is not alive, the stand-by node takes over the function of the malfunctioning peer node, and also takes over the IP-addresses of the malfunctioning node, which results in a smooth transition which the surrounding nodes in the network won't notice.

Before the invention is described in detail, the components in the network 100 of FIG. 1 will now be described. The network 100 is a so called Evolved Packet System, an EPS, and comprises the following components:
PGW, 105: A PDN Gateway to the network 100,
IP NW1, 110: An IP Network by means of which nodes in the network 100 are connected to each other,
SGW 1, 115: Serving Gateway 1,
SHW 2, 120: Serving Gateway 2, IP NW2, 125: An IP Network by means of which nodes in the network 100 are connected to each other, MME, 130: Mobility Management Entity, eNodeB, 135: evolved NodeB, a so called Radio Base Station of the network, UE, 140: User Equipment, e.g. a mobile telephone, a laptop computer, etc.

It should be pointed out that the fact that the network 100 is shown as comprising two IP networks, i.e. IP NW1 and IP NW 2, is a design issue; the network could also be designed with one IP network which serves the same function as IP NW1 and IP NW 2 in FIG. 1.

As can be seen in FIG. 1, SGW 1 and SGW 2 are connected to each other via the IP NW 125 and IP NW 125, and are in a peer-to-peer relationship to each other. The peer-to-peer relationship between the two SGWs is maintained by means of the VRRP, as described above, which here functions in the following fashion:

The VRRP selects one of the nodes in the peer-to-peer relationship to be the active node and selects the other node in the relationship to be the stand-by node. By means of the VRRP, SGW2 supervises SGW1, and if SGW2 detects that SGW1 is malfunctioning, e.g. not responding, SGW2 will take over SGW1's IP-addresses and continue its services as if it were SGW1. The VRRP also includes functionality to "track" interfaces that provides connectivity to other nodes in the network. This is to insure that the node that is selected to be active also has connectivity to other nodes.

A function of the present invention is that it allows a standby node in a peer-to-peer relationship to start functioning as the active node in a manner which enables a UE which is connected to the network to have a smooth transition from the malfunctioning (previously active) node to the new active node.

This is accomplished by the present invention in that a node in the network 100 is arranged to function with a second protocol in addition to the VRRP.

Naturally, in some embodiments, the second protocol can be comprised in the VRRP as an extension of the VRRP, but the second protocol will here be described as being a second protocol in addition to the VRRP. Both of these embodiments are encompassed by the present invention.

In addition, the invention can be applied to a large number of nodes in an EPS, but will here be described as being applied to the SGWs shown in FIG. 1, i.e. SGW 1 and SGW 2. The second protocol of the invention will here also be referred to as the State Transition Application Protocol, the STAP, since a function of the second protocol of the invention is to transfer information on a state of a UE (or more than one UE) from the active node to the stand-by node in the peer-to-peer relationship.

Figure 2:
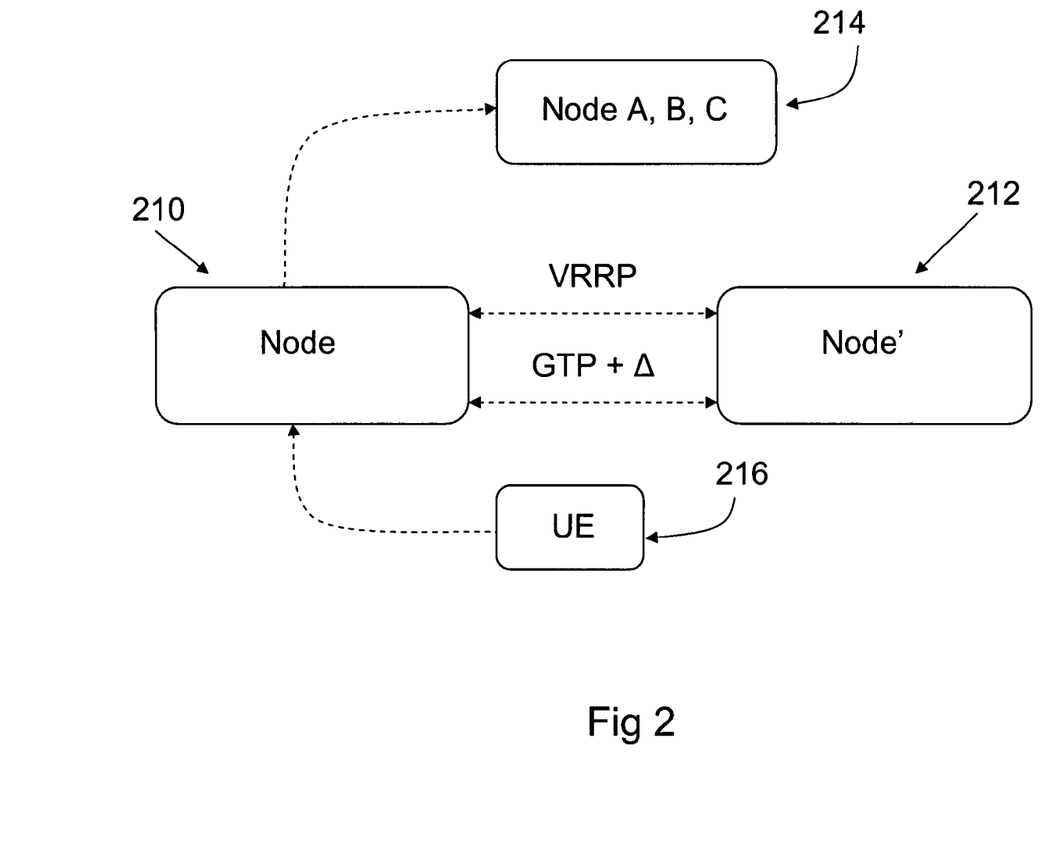
FIG. 2 shows an overview of a node with a protocol of the invention.

The function of a node of the invention, i.e. a node which is equipped with both the VRRP and the second protocol of the invention will now be described with reference to FIG. 2. Since the invention can be applied to a large variety of nodes in an EPS network, the FIG. 2 shows two nodes with the generic names Node 210, and Node' 212, which are connected to each other in a peer-to-peer relationship by means of a VRRP, as shown in FIG. 2. It should be pointed out that there may be intermediate nodes in between the two nodes 210 and 212, but such nodes are not shown here, for the sake of clarity. In addition, the IP Network by means of which the nodes in FIG. 2 are connected to each other is not shown in FIG. 2 either, although it is present, again for the sake of clarity. Due to the fact that all of the elements of the EPS are not shown in FIG. 2, the arrows which connect the nodes in FIG. 2 are drawn with dotted lines, in order to indicate that these connections are not direct, but may pass through other nodes and/or functions.

FIG. 2 also shows a UE 216, connected to the node 210, and a generic "other node" 214, reference in FIG. 2 as Node A, B, C, since the node 214 is intended to illustrate the fact that the node 210 is connected to a number of other nodes in the system.

As is also shown in FIG. 2, the two nodes 210, 212 are connected to each other by means of a second protocol as well as by the VRRP. The second protocol is shown in FIG. 2 as "GTP+Δ", since the second protocol of the invention in one embodiment is based on GTP, the GPRS Tunneling Protocol.

The function of the second protocol, the STAP, will now be described in more detail: The STAP transfers the UE's state from Node 210 (the active node) to the node 212 (the standby node) every time the state of the UE has changed.

The protocol used between nodes in the EPS shown in FIG. 2 for signaling is in one embodiment the 3GPP protocol of TS 29.274, i.e. GTPv2, and the TS 29.060, i.e. GTPv1. In one embodiment, the present invention uses these protocols as a base.

There are a number of cases where a UE changes state in the active node, which, as mentioned can, for example, be one of the following nodes: SGSN, MME, Serving-GW and PDN-GW.

Every time that an UE changes its state, the active node must inform the standby node of this fact. The nodes involved can handle large numbers of UEs, which means that the signalling capacity between nodes will need to be high. To reduce the signaling load caused by the invention, the inventive STAP in the active node may, in one embodiment, only signal the UE's state-change to the standby node when the UE is in a stable state. The term "stable state" refers to a case when a specific signaling flow is completed, a notion which will be explained further in the following. However, this is an implementation and optimization issue, the invention may also be used for every state-change in the active node.

Turning now to the states which are changed in the node for the UE, and which the stand-by node is informed of, these states may include the following:

The QoS, Quality of Service of the end user,

The IP address of one or more node in the system which is adjacent to the end user, The EPS Bearer Contexts of the user, Tunnel IDs for tunnels used to carry signaling and user payload for the UE, Information related to handling of charging for the UE, Maximum Bit Rates for the UE and its bearers, Serving Network and User Location Information for the UE, IMSI and MSISDN of the UE, International Mobile Subscriber Identity and Mobile Subscriber ISDN Number.

As mentioned, the STAP of the present invention transfers information on the UE's state from the active node to the standby node when the state of the UE has changed. In one example of an embodiment, the protocol used between the nodes in an EPS for signaling is the 3GPP protocol GTPv2 and GTPv1. These protocols can be used by the present invention as a base, i.e. the STAP can be an expansion of the GTP protocol.

There is a variety of cases in which a UE changes a state in the nodes of the EPS, examples of nodes being SGSN, MME, Serving-GW and PDN-GW. These nodes can handle several 1000, or maybe up to many 1000000 UEs, which means that the signaling capacity between nodes will need to be quite high in order for "state change information" to be transferred.

In order to address this situation, the present invention, in one embodiment, uses the solution of letting STAP of the active node only signal the UE's state-change to the standby node when the UE is in a stable state. The term "stable state" is here used to signify a situation in which a specific signaling flow is completed, which will be illustrated with reference to FIG. 3. However, the occasions on which "state change information" is transferred between nodes by the STAP is an implementation and optimization issue; the invention is equally applicable in a system where every "state change information" is transferred to the stand-by node.

Figure 3:
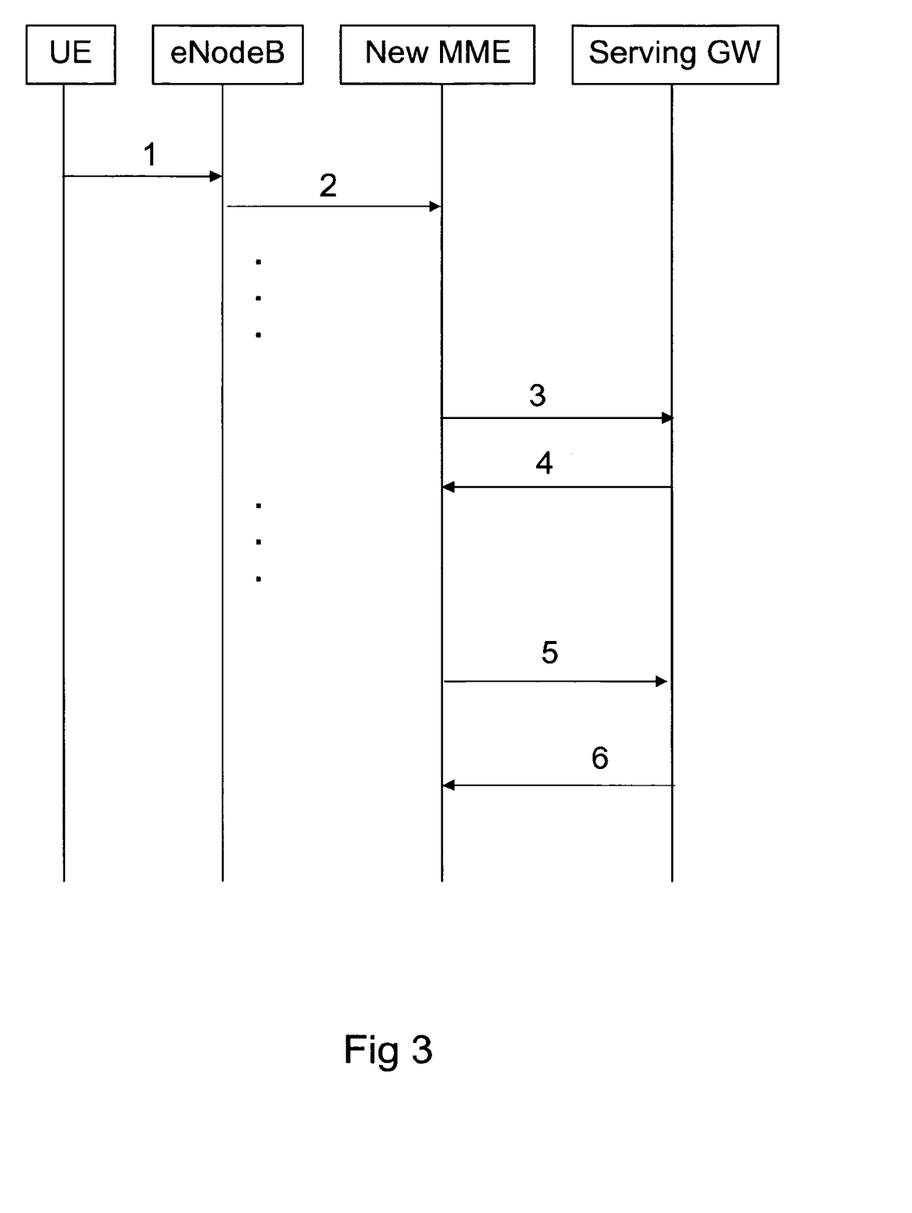
FIG. 3 shows a signaling flow in a system in which the invention is used.

The notion of "stable state" will now be explained further with reference to FIG. 3, which shows a diagram of some of the messages involved when a UE attaches to an EPS. It should be pointed out that FIG. 3 does not show all of the messages or nodes involved during such an event. Instead, FIG. 3 shows the messages which initiate and mark the end of a "stable state", and the nodes between which such messages are exchanged. Thus, the "attach" sequence comprises more messages and nodes than those used in the example shown in FIG. 3.

The messages shown in FIG. 3 are the following:
1: "Attach Request" from the UE to the eNodeB.
2: "Attach Request" from the eNodeB to the (new) MME, the Mobility Management Entity.
3: "Create Session Request" from the MME to the serving GW.
4: "Create Session Response" from the Serving Gateway to the MME.
5: "Modify Bearer Request" from the MME to the Serving Gateway.
6: "Modify Bearer Response" from the Serving Gateway to the MME.

Stable states in the sense that the term has been used here are achieved at points 2, 4, and 6 above. Using steps 3 and 4 as examples to explain the term "stable states" further, the following happens in a node (in this case, a Serving Gateway) of the invention with respect to its stand-by node in those steps:

A stable state in the Serving-GW, SGW, is at step 4. At this step, the active SGW, when configured with the STAP protocol of the invention, function, will signal to the standby node, i.e. the stand-by SGW using the STAP protocol. The STAP signaling for this UE Attach procedure in the SGW nodes (active and stand-by) will, at step 4, be:

The active SGW sends a "Create Session Request" to the standby node. This message, according to the invention, has an indication telling the SGW to only create a "context" for the UE in question, in the same way that the active SGW has done at step 3, but not to perform any signaling to surrounding nodes. The standby node must also be prepared to take over the UE any time. The message also, according to the invention, includes additional information (e.g. F-TEIDs, Fully Qualified Tunnel End Point Identifiers.) that the active SGW has allocated to be used by the surrounding nodes. Such additional information is saved by the standby node (standby SGW in this example) for use when/if the standby node becomes the active node. The standby SGW replies to the active SGW with a "Create Session Response" message.

The active SGW will do a similar STAP signalling sequence at step 6, but at that point the SGW uses the message "Modify Bearer Request" with an indication and additional information regarding the modification step as explained above.

This "attach procedure" is merely one example intended to illustrate the use of the invention's STAP protocol; the same protocol will be used in other signaling flows in an node pair which uses the STAP, for example in the signaling flow of the procedures "Tracking Area Update" and "Service Request" procedure and, for example, other handover procedures where a UE changes state.

A similar procedure is also used by other nodes in an EPS that are configured with the STAP protocol of the invention.

In each "STAP-GTP-message" from the active node to the stand-by node, such as "Create Session Request", there is, in one embodiment of the invention, an indication telling the standby node to perform the actions indicated in the message without allocating resources to be used by surrounding nodes (e.g. F-TEIDs, see next paragraph below) and to perform no signaling to surrounding nodes. This indication can, for example, be implemented as an optional flag in the message or by using the GTP Private Extension feature.

A standby node which uses the STAP of the invention must be able to take over the UE any time from the active node with a minimum of interruption and without any negative impact on the surrounding nodes. This requires the active node to send to the standby node the information which it has allocated for use by surrounding nodes. The VRRP takes care of "transport IP-level" parameters, such as the node's IP-addresses, while the STAP of the invention takes care of the parameters for the UE's session. These parameters are, for example, the F-TEID's for both the control plane and the user data plane. These parameters may be transferred in the messages using either specific GTP-parameters or by using the GTP Private Extension feature.

Figure 4:
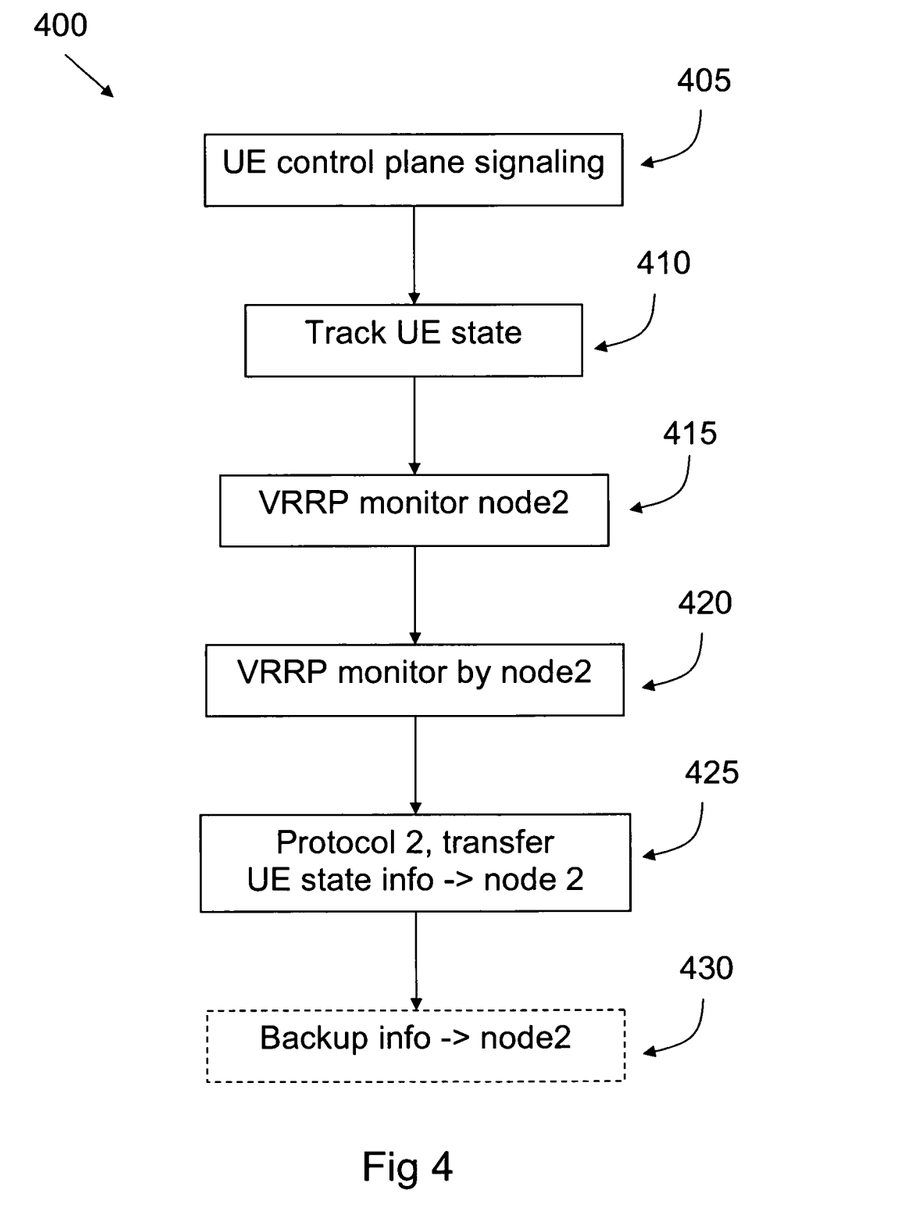
FIG. 4 shows a flow chart of a first method of the invention.

FIG. 4 shows a flow chart of a first method 400 of the invention. Steps which are options or alternatives have been indicated by means of dashed lines in FIG. 4.

The method 400 is intended for use in a node for a mobile network, and as shown, comprises arranging the node to:
  Forward, step 405, control plane signaling to and from an end user in the system to other nodes in the system,
  keep track, step 410, of a state of the end user,
  use a so called VRRP protocol, Virtual Router Redundancy Protocol, to monitor, step 415, the function of a second node in the system, a so called "peer node" to the node itself,
  have its own function be monitored, step 420, by a VRRP of the peer node.

As shown in step 425, the method 400 also comprises arranging the node to use a second protocol for transferring information on a state of the end user to the peer node.

As indicated in step 430, in one embodiment, the method 400 further comprises arranging the node to transfer information to the peer node that information transferred on the state of the end user is transferred to the peer node as back up information for use in the case that the peer node's VRRP indicates that the transferring node exhibits a malfunction.

Figure 5:
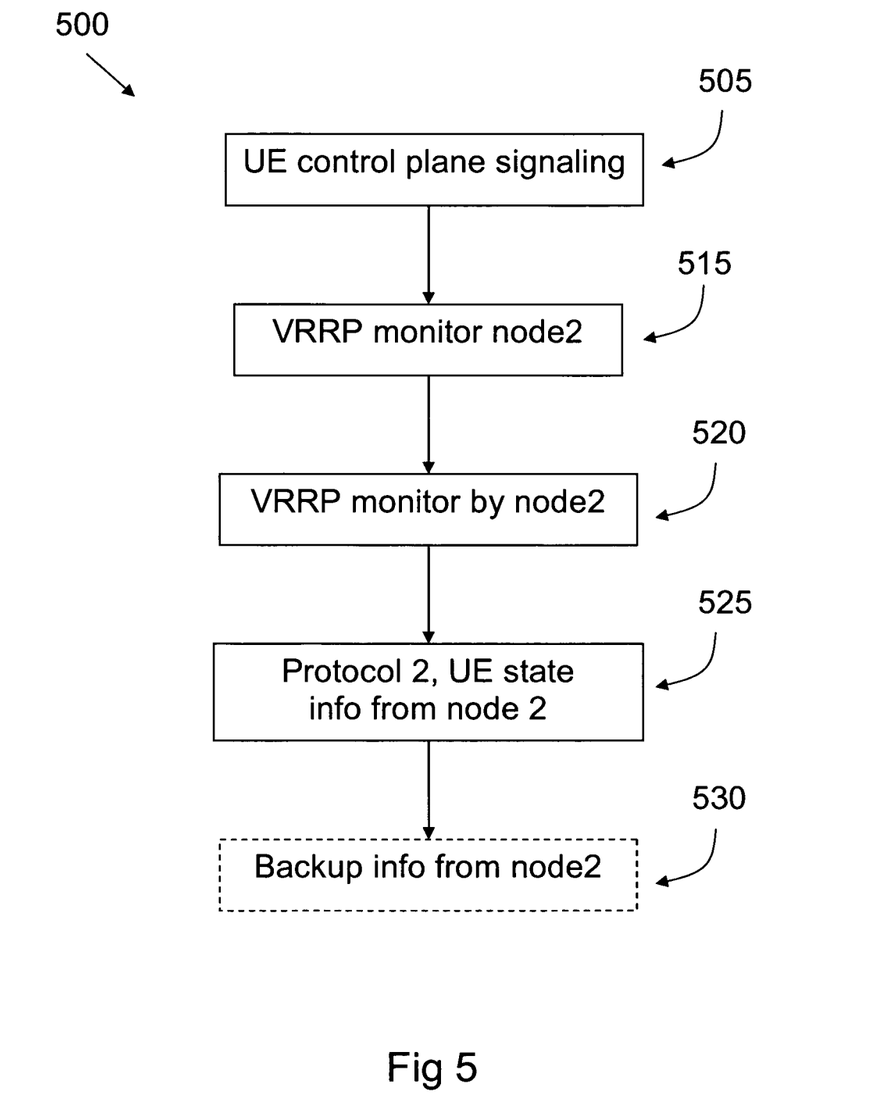
FIG. 5 shows a flow chart of a second method of the invention.

FIG. 5 shows a flow chart of a second method 500 of the invention. Steps which are options or alternatives have been indicated by means of dashed lines in FIG. 5.

The method 500 is intended for use in a node for a mobile network, and comprises arranging the node to:
  forward, step 505, control plane signaling to and from an end user in the system to other nodes in the system,
  to use, step 515, a so called VRRP protocol, Virtual Router Redundancy Protocol, to monitor the function of a second node in the system, a so called "peer node" to the node itself,
  to have its own function be monitored, step 520, by the VRRP of the peer node.

The method 500 also comprises, step 525, arranging the node to use a second protocol for receiving information on a state of the end user from the peer node.

As indicated in step 530, the method 500 also in one embodiment comprises arranging the node to be informed by the peer node that information transferred on the state of the end user is transferred to the node as back up information for use in the case that the node's VRRP indicates that the peer node malfunctions.

In both the methods 400 and 500, the second protocol in some embodiments uses the GTP protocol, the GPRS Tunneling Protocol.

In both the methods 400 and 500, in some embodiments, the information on a state of the end user which is transferred or received comprises one or more of the following:

The QoS, Quality of Service of the end user,
The IP address of one or more node in the system which is adjacent to the end user,
The EPS Bearer Contexts of the user.

Both the methods 400 and 500 can, in some embodiments, be applied to a node which is one of the following:

An eNodeB in an LTE system, Long Term Evolution,
An MME, Mobility Management Entity in a 3GPP system, third generation partnership project,
A Serving Gateway, a GW in a 3GPP system,
A Packet Data Network Gateway, a PDN GW, in a 3GPP system.

The invention is not limited to the examples of embodiments described above and shown in the drawings, but may be freely varied within the scope of the appended claims.

The invention claimed is:

1. A first node for a mobile network, comprising a memory and a processor coupled to the memory, the memory comprising executable instructions that when executed by the processor results in the first node being arranged to forward control plane signaling to and from an end user to other nodes and also being arranged to keep track of a state of the end user, the first node being arranged to use a Virtual Router Redundancy Protocol (VRRP) to monitor the function of a peer node and to have its own function be monitored by a VRRP of the peer node, the first node being also arranged to use a second protocol for transferring information on a state of the end user to the peer node, wherein
   the first node is a first Serving Gateway (SGW),
   the peer node is a second SGW,
   the first SGW is arranged to receive from a mobility management node (MMN) a Create Session Request message,
   the first SGW is further arranged such that, in response to receiving the Create Session Request message from the MMN, the first SGW sends a session request message to a Packet Data Network Gateway (PDN GW), which is configured to send a session response message to the first SGW, and
   the first SGW is further arranged such that in response to receiving from the PDN GW the session response message, the first SGW forwards to the second SGW said Create Session Request message received from the MMN and sends to the MMN a Create Session Response message.

2. The first node of claim 1, further being arranged to inform the peer node that information transferred on the state of the end user is transferred to the peer node as back up information for use in the case that the peer node's VRRP indicates that the first node exhibits a malfunction.

3. The first node of claim 1, in which the second protocol uses the GTP protocol, the GPRS Tunneling Protocol.

4. The first node of claim 1, in which the information on a state of the end user comprises one or more of the following:
   The QoS, Quality of Service of the end user,
   The IP address of one or more node which is adjacent to the end user,
   The EPS Bearer Contexts of the user,
   Tunnel IDs for tunnels used to carry signaling and user payload for the UE,
   Information related to handling of charging for the UP,
   Maximum Bit Rates for the UE and its bearers,
   Serving Network and User Location Information for the UE,
   IMSI and MSISDN of the UE, International Mobile Subscriber Identity and Mobile Subscriber ISDN Number.

5. The first node of claim 1, being one of the following:
   An eNodeB in an LTE system, Long Term Evolution,
   An MME, Mobility Management Entity in a 3GPP system, third generation partnership project,
   A Serving Gateway, a GW in a 3GPP system,
   A Packet Data Network Gateway, a PDN GW, in a 3GPP system.

6. The first node of claim 1, wherein
   the first node is arranged to receive a first GPRS Tunneling Protocol (GTP) message from a second node,
   the first GTP message comprises said information on said state of the end user,
   the first node is arranged to use the second protocol to transfer said information on said state of the end user to the peer node as a result of receiving the first GTP message,
   the second protocol is the GPRS Tunneling Protocol, and
   the first node is arranged to transfer said information on said state to the peer node by sending to the peer node a second GTP message that includes said information on said state of the end user.

7. The first node of claim 1, wherein the first node is a first Serving Gateway (SGW), and the peer node is a second SGW.

8. A method for use in a first node for a mobile network, the method comprising arranging the first node to:
   forward control plane signaling to and from an end user to other nodes,
   keep track of a state of the end user,
   use a Virtual Router Redundancy Protocol (VRRP) to monitor the function of a peer node to the first node,
   have its own function be monitored by a VRRP of the peer node, and
   use a second protocol for transferring information on a state of the end user to the peer node, wherein,
   the first node is a first Serving Gateway (SGW),
   the peer node is a second SGW, and
   the method further comprises:
   the first SGW receiving from a mobility management node (MMN) a Create Session Request message,
   the first SGW, in response to receiving the Create Session Request message from the MMN, sending a session request message to a Packet Data Network Gateway (PDN GW), which is configured to send a session response message to the first SGW,
   the first SGW receiving said session response message transmitted by the PDN GW,
   the first SGW, in response to receiving said session response message, the first SGW forwarding to the second SGW said Create Session Request message received from the MMN and sending to the MMN a Create Session Response message.

9. The method of claim 8, wherein the information on the state of the end user is transferred to the peer node as back up information for use in the case that the peer node's VRRP indicates that the first node exhibits a malfunction.

10. The method of claim 8, according to which the second protocol uses the GTP protocol, the GPRS Tunneling Protocol.

11. The method of claim 8, according to which the state of the end user on which information is transferred comprises one or more of the following:
   The QoS, Quality of Service of the end user,
   The IP address of one or more node which is adjacent to the end user,
   The EPS Bearer Contexts of the user,
   Tunnel IDs for tunnels used to carry signaling and user payload for the UE,
   Information related to handling of charging for the UE,
   Maximum Bit Rates for the UE and its bearers,
   Serving Network and User Location Information for the UE,
   IMSI and MSISDN of the UE, International Mobile Subscriber Identity and Mobile Subscriber ISDN Number.

12. The method of claim 8, applied to a first node which is one of the following:
   An eNodeB in an LTE system, Long Term Evolution,
   An MME, Mobility Management Entity in a 3GPP system, third generation partnership project,
   A Serving Gateway, a GW in a 3GPP system,
   A Packet Data Network Gateway, a PDN GW, in a 3GPP system.

13. The method of claim 8, wherein
   the method further comprises the first node receiving a first GPRS Tunneling Protocol (GTP) message from a second node,
   the first GTP message comprises said information on said state of the end user,
   the first node uses the second protocol to transfer said information on said state of the end user to the peer node as a result of receiving the first GTP message,
   the second protocol is the GPRS Tunneling Protocol, and
   the step of using the second protocol to transfer said information on said state to the peer node comprises sending to the peer node a second GTP message that includes said information on said state of the end user.

* * * * *